United States Patent
Hanlon et al.

(10) Patent No.: US 11,236,639 B2
(45) Date of Patent: Feb. 1, 2022

(54) GAS TURBINE ENGINE AND AN AIRFLOW CONTROL SYSTEM

(71) Applicant: United Technologies Corporation, Hartford, CT (US)

(72) Inventors: Christopher J. Hanlon, Sturbridge, MA (US); Daniel B. Kupratis, Wallingford, CT (US); Walter A. Ledwith, Marlborough, CT (US); William F. Schneider, Cromwell, CT (US); Sean Danby, East Hampton, CT (US); Robert H. Bush, Glastonbury, CT (US); Benjamin Bellows, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1268 days.

(21) Appl. No.: 14/618,572

(22) Filed: Feb. 10, 2015

(65) Prior Publication Data

US 2016/0230658 A1   Aug. 11, 2016

(51) Int. Cl.
| | |
|---|---|
| *F01D 25/30* | (2006.01) |
| *F02K 3/10* | (2006.01) |
| *F02C 7/18* | (2006.01) |
| *F02K 3/077* | (2006.01) |
| *F02K 3/075* | (2006.01) |
| *F01D 1/02* | (2006.01) |
| *F02K 3/02* | (2006.01) |
| *F02K 3/105* | (2006.01) |

(52) U.S. Cl.
CPC ............. *F01D 25/30* (2013.01); *F01D 1/023* (2013.01); *F02C 7/185* (2013.01); *F02K 3/075* (2013.01); *F02K 3/077* (2013.01); *F02K 3/10* (2013.01); *F02K 3/02* (2013.01); *F02K 3/105* (2013.01); *F05D 2260/213* (2013.01); *Y02T 50/60* (2013.01)

(58) Field of Classification Search
CPC ..... F02K 3/02; F02K 3/04; F02K 3/10; F02K 3/105; F02K 3/115; F02K 3/075; F02K 3/077; F02C 9/18; F02C 6/08; F02C 7/141; F02C 7/185; F01D 25/30; F05D 2260/213
See application file for complete search history.

(56) References Cited

U.S. PATENT DOCUMENTS

| | | | | | |
|---|---|---|---|---|---|
| 4,254,618 | A | * | 3/1981 | Elovic | F02C 7/185 |
| | | | | | 60/226.1 |
| 4,435,958 | A | * | 3/1984 | Klees | F02K 3/075 |
| | | | | | 60/204 |
| 5,404,713 | A | * | 4/1995 | Johnson | F02K 1/825 |
| | | | | | 60/204 |

(Continued)

*Primary Examiner* — Thomas P Burke
(74) *Attorney, Agent, or Firm* — Getz Balich LLC (57) ABSTRACT

A gas turbine engine includes a core flowpath for flowing a core stream, a second flowpath located radially outward from the core flowpath for flowing a second stream, and an auxiliary flowpath located radially outward from the second flowpath for flowing an auxiliary stream. A heat exchanging device is constructed and arranged to divert a portion of the second stream into the auxiliary flowpath. A turbine exhaust case is constructed and arranged to flow the auxiliary stream into the core flowpath for mixing with the core stream.

20 Claims, 3 Drawing Sheets

(56) References Cited

U.S. PATENT DOCUMENTS

| | | | | |
|---|---|---|---|---|
| 5,694,767 | A | * | 12/1997 | Vdoviak ............... F02K 3/10 60/226.3 |
| 5,778,658 | A | * | 7/1998 | Lamando, Jr. ......... F02K 1/822 60/204 |
| 5,806,303 | A | | 9/1998 | Johnson |
| 5,809,772 | A | | 9/1998 | Giffin, III et al. |
| 6,182,435 | B1 | | 2/2001 | Niggemann et al. |
| 6,748,743 | B1 | | 6/2004 | Foster-Pegg |
| 7,246,484 | B2 | * | 7/2007 | Giffin, III ............... F02K 3/072 60/226.3 |
| 7,377,100 | B2 | | 5/2008 | Bruno et al. |
| 7,395,657 | B2 | | 7/2008 | Johnson |
| 7,614,210 | B2 | * | 11/2009 | Powell ................ F02K 1/08 60/226.1 |
| 7,926,261 | B2 | | 4/2011 | Porte |
| 8,756,910 | B2 | | 6/2014 | Donovan et al. |
| 2005/0109012 | A1 | * | 5/2005 | Johnson ............... F02K 3/065 60/226.1 |
| 2010/0126177 | A1 | * | 5/2010 | Hautman .............. F23R 3/20 60/752 |
| 2012/0102961 | A1 | * | 5/2012 | Joshi .................. F23R 3/20 60/761 |
| 2012/0131902 | A1 | | 5/2012 | Baughman et al. |
| 2016/0208692 | A1 | * | 7/2016 | Hanlon ................ F02C 9/18 |
| 2016/0298550 | A1 | * | 10/2016 | Kupratis .............. F02C 3/13 |
| 2016/0312740 | A1 | * | 10/2016 | Kupratis .............. F02K 3/075 |

\* cited by examiner

| Operating Mode | Flight Condition | Engine Thrust | Liner(83) Driving Pressure(LPR) | HX Device(118) Cold Side Flow Required | HX Device(118) Cold Side Driving Pressure | Main Nozzle Area |
|---|---|---|---|---|---|---|
| Max Power Maximum HX Device(118) | Takeoff | High | High | High | High | Open |
| Low Power Maximum HX Device(118) | Cruise | Low | Low | Low/None | Low | Nominal/Closed |

FIG. 3

GAS TURBINE ENGINE AND AN AIRFLOW CONTROL SYSTEM

BACKGROUND

The present disclosure relates to a gas turbine engine, and more particularly to an engine having an airflow control system.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion.

Variable cycle gas turbine engines power aircraft over a range of operating conditions yet achieve countervailing objectives such as high specific thrust and low fuel consumption. The variable cycle gas turbine engine essentially alters a bypass ratio during flight to match requirements. This facilitates efficient performance over a broad range of altitudes and flight conditions to generate high thrust for high-energy maneuvers yet optimize fuel efficiency for cruise and loiter.

Variable cycle gas turbine engines require an effective actuation system to vary the bypass ratio (BPR) between maximum afterburning conditions and cruise conditions to operate the engine at various cycle points. Variable cycle gas turbine engines are typically of a three-stream engine architecture in which a two-stage fan directly feeds all three streams, e.g., core stream, second stream, third stream. Typically, a part-span booster fan stage feeds the core stream and the second stream. Although effective, this architecture requires a relatively complex fan design and a challenging intermediate case design due to the limited area available to execute three streams in the same required package of traditional two stream engines.

SUMMARY

A gas turbine engine according to one, non-limiting, embodiment of the present disclosure includes a fan section constructed and arranged to receive and expel an airflow; a compressor section in fluid communication with the fan section and constructed and arranged to receive a core stream of the airflow discharged from the fan section; a combustor section in fluid communication with the compressor section and constructed and arranged to receive at least a portion of the core stream discharged from the compressor section; a turbine section in fluid communication with the combustor section and constructed and arranged to receive and extract power from the at least a portion of the core stream discharged from the combustor section, wherein the turbine section is rotationally coupled to the compressor section and the fan section; a second flowpath in fluid communication with the fan section and constructed and arranged to receive a second stream of the airflow discharged from the fan section; a turbine exhaust case disposed downstream of the turbine section and constructed and arranged to separately receive and expel the core stream and the second stream; a heat exchanging device in fluid communication with the second flowpath and constructed and arranged to flow at least a portion of an auxiliary stream of the second stream; and an auxiliary flowpath in fluid communication between the heat exchanging device and the turbine exhaust case and constructed and arranged to receive the at least a portion of the auxiliary stream discharged from the heat exchanging device and discharge the auxiliary stream into the turbine exhaust case for mixing with the core stream as a mixed stream.

Additionally to the foregoing embodiment, the compressor section, the combustor section, the turbine section and the turbine exhaust case together form a core flowpath for flow of the core stream.

In the alternative or additionally thereto, in the foregoing embodiment, the engine includes an exhaust duct section in fluid communication with the turbine exhaust case and constructed and arranged to receive the mixed and second streams discharged from the turbine exhaust section.

In the alternative or additionally thereto, in the foregoing embodiment, the turbine exhaust case and the exhaust duct section each include in-part a portion of the second flowpath.

In the alternative or additionally thereto, in the foregoing embodiment, the second flowpath is annular in shape.

In the alternative or additionally thereto, in the foregoing embodiment, the turbine exhaust case includes in-part the second flowpath and includes in-part the core flowpath.

In the alternative or additionally thereto, in the foregoing embodiment, the turbine exhaust duct section includes a portion of the second flowpath and at least a portion of a substantially cylindrical exhaust flowpath in axial fluid communication with the core flowpath at the turbine exhaust case.

In the alternative or additionally thereto, in the foregoing embodiment, the exhaust flowpath is in fluid communication with the second flowpath to receive a remaining portion of the second stream discharged from the second flowpath.

In the alternative or additionally thereto, in the foregoing embodiment, the exhaust flowpath is constructed and arranged to receive the mixed stream discharged from the turbine exhaust case.

In the alternative or additionally thereto, in the foregoing embodiment, the engine includes a high spool constructed and arranged to rotate about an engine axis; and a low spool constructed and arranged to rotate about the engine axis, and wherein the fan section includes a fan leading stage connected for rotation to the low spool, and a fan aft stage connected for rotation to the high spool.

In the alternative or additionally thereto, in the foregoing embodiment, the turbine section includes a high pressure turbine connected to the high spool and a low pressure turbine connected to the low spool.

In the alternative or additionally thereto, in the foregoing embodiment, the heat exchanging device includes a conduit loop in direct fluid communication between the core flowpath and a hot side of the heat exchanging device for flowing heated air discharged from the core flowpath to the hot side and returning the cooled hot air from the hot side and generally to the core flowpath for cooling engine components, and wherein a cold side of the heat exchanging device is in fluid communication between the second flowpath and the auxiliary flowpath and is constructed and arranged to flow at least the portion of the auxiliary stream for cooling the hot air.

In the alternative or additionally thereto, in the foregoing embodiment, the turbine exhaust case includes a first shroud, a second shroud, and a plurality of circumferentially spaced conduits extending radially between and in fluid communication through the first and second shrouds for flowing the auxiliary stream from the auxiliary flowpath and into the core flowpath.

A gas turbine engine according to another, non-limiting, embodiment includes a core case concentrically located about the engine axis, wherein a core flowpath is defined radially inward of the core case for flowing a core stream; a second case spaced radially outward of the core case, wherein a second flowpath is defined radially between the core and second cases for flowing a second stream; an outer case spaced at least in-part radially outward from the second case, wherein an auxiliary flowpath is defined at least in-part radially between the second and outer cases for flowing an auxiliary stream; and a turbine exhaust case including a portion of the core and second cases, wherein the auxiliary flowpath is in fluid communication with the second flowpath for receiving at least a portion of the auxiliary stream discharged from the second flowpath and upstream of the turbine exhaust case, and wherein the auxiliary flowpath is in fluid communication with the core flowpath at the turbine exhaust case for expelling the auxiliary stream into the core flowpath.

Additionally to the foregoing embodiment, the engine includes a heat exchanging device constructed and arranged to provide the fluid communication between the second flowpath and the auxiliary flowpath located upstream of the turbine exhaust case.

In the alternative or additionally thereto, in the foregoing embodiment, the engine includes a high spool constructed and arranged to rotate about an engine axis; and a low spool constructed and arranged to rotate about the engine axis, and wherein the fan section includes a fan leading stage connected for rotation to the low spool, and a fan aft stage connected for rotation to the high spool.

In the alternative or additionally thereto, in the foregoing embodiment, the turbine section includes a high pressure turbine connected to the high spool and a low pressure turbine connected to the low spool.

In the alternative or additionally thereto, in the foregoing embodiment, the heat exchanging device includes a conduit loop in direct fluid communication between the core flowpath and a hot side of the heat exchanging device for flowing heated air from the core flowpath to the hot side and returning the cooled hot air from the hot side and through the core case for cooling components within the core case, and wherein a cold side of the heat exchanging device is constructed and arranged to flow at least the portion of the auxiliary stream discharged from the second flowpath for cooling the hot air.

In the alternative or additionally thereto, in the foregoing embodiment, the turbine exhaust case is constructed and arranged to mix the auxiliary stream with the core stream in the core flowpath.

A method of operating a gas turbine engine according to another, non-limiting, embodiment includes the steps of diverting a portion of a second stream flowing through a second flowpath located radially outward of a core flowpath; flowing the portion of the second stream through a heat exchanging device; discharging the portion of the second stream into an auxiliary flowpath located radially outward from the second flowpath and as at least a portion of an auxiliary stream; discharging the auxiliary stream from the auxiliary flowpath and into a turbine exhaust case; and mixing the auxiliary stream with a core stream in the core flowpath at the turbine exhaust case.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
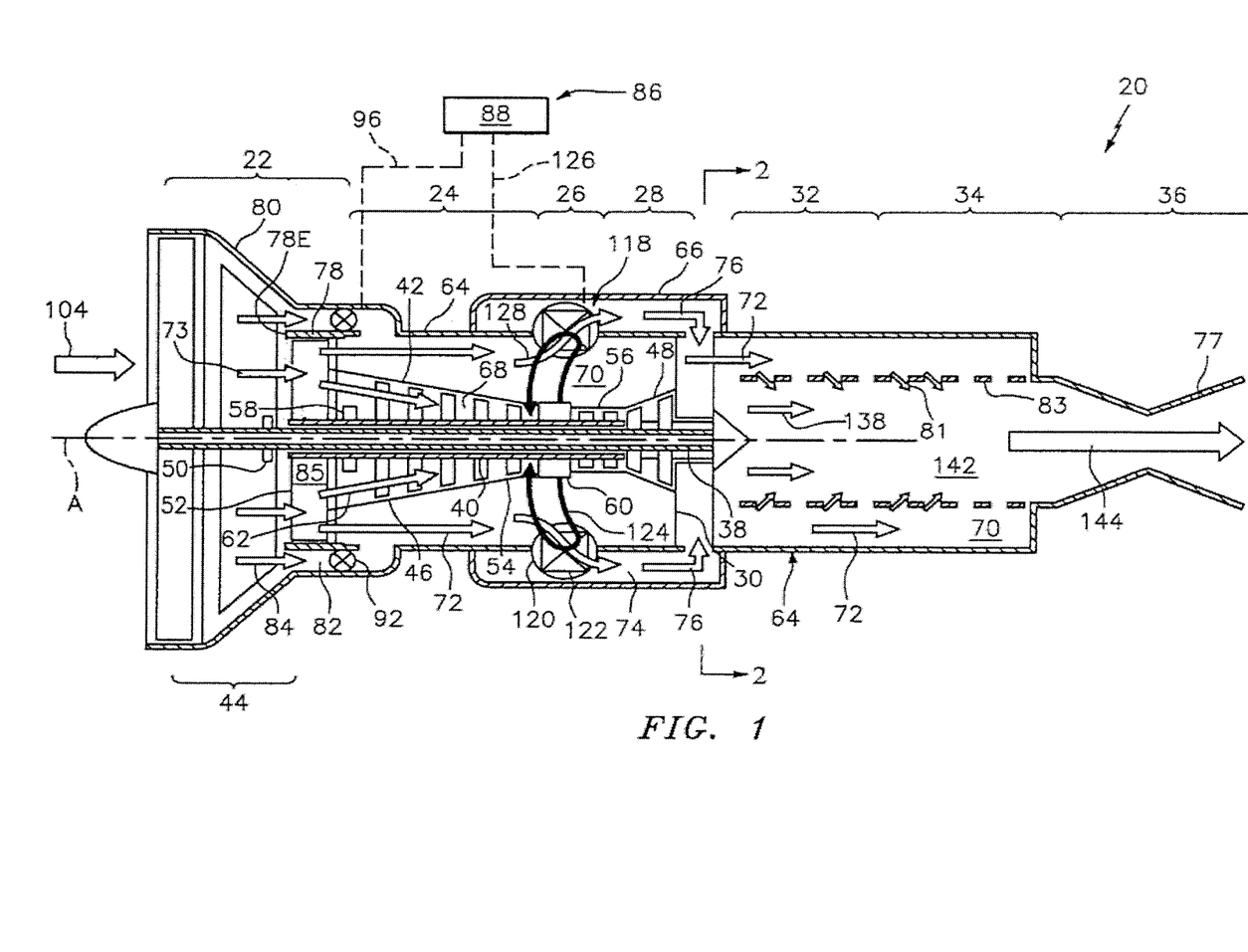
FIG. 1 is a schematic cross-section of a gas turbine engine of the present disclosure.

FIG. 1 schematically illustrates a gas turbine engine 20. The gas turbine engine 20 is disclosed herein as a two-spool turbo fan that generally incorporates a fan section 22, a compressor section 24, a combustor section 26, a turbine section 28, and a turbine exhaust case 30 (TEC). In a downstream direction from the TEC 30, the engine 20 may further include an augmentor section 32, an exhaust duct section 34 and a nozzle section 36. The fan section 22 drives air along a second flowpath while the compressor section 24 drives air along a core flowpath for compression and communication into the combustor section 26 then expansion through the turbine section 28. The fan, compressor and turbine sections 22, 24, 28 may each include various architectures that, for example, include a plurality of stages, each with or without various combinations of blades and variable or fixed guide vanes orientated about an engine axis A.

Variable cycle gas turbine engines power aircraft over a range of operating conditions and essentially alters a bypass ratio during flight to achieve objectives that may be countervailing (such as high specific thrust for high-energy maneuvers) yet optimizes fuel efficiency for cruise and loiter modes of operation. Although depicted as an augmented low bypass turbofan in the disclosed, non-limiting, embodiment, it is understood that the concepts described herein are applicable to other types of turbine engines including non-augmented engines, geared architecture engines, high bypass and/or direct drive turbofans, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 38 and a high spool 40 mounted for rotation about the engine axis A, and relative to an engine core case 42, via several bearing structures (not shown). The low spool 38 generally includes an inner shaft that interconnects at least one leading fan stage 44 of the fan section 22, a LPC 46 of the compressor section 24 and a LPT 48 of the turbine section 28. The inner shaft of the low spool 38 drives the leading fan stage 44 directly, or through a geared architecture 50 to drive the leading fan stage 44 at a lower speed than the low spool 38.

An exemplary reduction transmission is an epicyclic transmission, namely a planetary or star gear system.

The high spool 40 includes an outer shaft that interconnects at least one aft fan stage 52 of the fan section 22, a HPC 54 of the compressor section 24 and a HPT 56 of the turbine section 28. The outer shaft of the high spool 40 drives the aft fan stage 52 directly, or through a geared architecture 58 to drive the aft fan stage 52 at a lower speed than the high spool 40. Like the geared architecture 50, an exemplary reduction transmission of the architecture 58 is an epicyclic transmission, namely a planetary or star gear system.

A combustor (not shown) of the combustor section 26 is arranged between the HPC 54 and the HPT 56 and, at least in-part, radially within a diffuser case module 60 of the core engine case 42. The inner and outer shafts of the respective low and high spools 38, 40 may be concentric and rotate about the engine axis A that is collinear with their, respective, longitudinal axis. A core air stream (see arrow 62) is compressed by the LPC 46 then the HPC 54, mixed with fuel and burned in the combustor of the combustor section 26, then expanded over the HPT 56 and the LPT 48. The LPT 48 and HPT 56 rotationally drive the respective low spool 38 and high spool 40 in response to the expansion.

By tying the at least one aft stage 52 of the fan section 22 to the HPT 56, the fan pressure ratio will lapse more strongly from high engine power to low engine power (i.e. steeper operating characteristic); thereby, improving part power propulsion efficiency and reducing fuel consumption at cruise. Also, by distributing the fan section 22 work across two spools 38, 40, the turbomachinery will be more aerodynamically and thermodynamically balanced allowing for a more optimal HPT and LPT component aero design and lighter weight.

In one non-limiting example, the gas turbine engine 20 is a high-bypass geared aircraft engine. In a further example, the gas turbine engine 20 bypass ratio is greater than about six (6:1). The geared architecture 50 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 38 at higher speeds that can increase the operational efficiency of the LPC 46 and LPT 48 and render increased pressure in a fewer number of stages.

A pressure ratio associated with the LPT 48 is pressure measured prior to the inlet of the LPT 48 as related to the pressure at the outlet of the LPT 48 prior to the exhaust section 36 of the gas turbine engine 20. In one non-limiting embodiment, the bypass ratio of the gas turbine engine 20 is greater than about ten (10:1), the fan diameter is significantly larger than that of the LPC 46, and the LPT 48 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by a bypass flow path due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of $(T/518.7)^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Aside from the core case 42, the engine 20 may include: a fan duct or intermediate case 64 spaced radially outward and, at least in-part, axially aligned to the core case 42; and an outer case 66 spaced, at least in-part, radially outward from, and axially aligned to, the intermediate case 64. The core case 42 generally defines a radially outward boundary of an annular core flowpath 68 for the flow of the core stream 62. The core and intermediate cases 42, 64 generally define, respective, radially inward and outward boundaries of an annular second flowpath 70 for the flow of a second stream (see arrow 72) of air. Generally, the second flowpath 70 may be part of a fan or bypass duct and the second stream 72 may be a high or low bypass air stream depending upon the engine application. The intermediate and outer cases 64, 66 generally define, respective, radially inward and outward boundaries of an auxiliary flowpath 74, that may be annular in flow cross-section, for the flow of an auxiliary stream (see arrow 76) of air. It is further understood and contemplated that the auxiliary flowpath 74 may not be annular, and instead may generally be a series of flowpaths each extending axially and circumferentially spaced or segmented from one-another.

A primary stream (see arrow 73) of air that enters the aft stage 52 of the fan section 22 is divided between the core stream 62 flowing through the core flowpath 68, and the second stream 72 flowing at least in-part through the second flowpath 70. The core stream 62 is compressed by the compressor section 24 mixed with fuel and burned in the combustor section 26, then expanded through the turbine section 28 to extract power.

The fan section 22 of the engine 20 includes inner and outer fan housings 78, 80. The inner fan housing 78 may generally be a forward extension of the intermediate case 64 and is located radially outward from and, at least in-part, axially aligned to the aft fan stage 52 of the fan section 22. The inner housing 78 may include a forward, distal, edge 78E that is circumferentially continuous and located immediately aft of the leading fan stage(s) 44. The fan outer housing 80 is circumferentially continuous, and surrounds the leading and aft stages 44, 52 of the fan section 22. A rearward or downstream portion of the outer housing 80 is spaced radially outward from the inner fan housing 78 and, together, form or define an annular bypass duct or flowpath 82 for the flow of a bypass stream (see arrow 84) of air that generally flows from the leading stage 44, bypasses the aft stage 52 and controllably enters the second flowpath 70 to combine with the second stream 72.

The aft stage 52 of the fan section 22 is located in a primary duct or flowpath 85 generally defined by a radially inward facing side of the inner fan housing 78. At least a substantial portion of the air that exits the fan leading stage 44 flows through the primary duct 85 (and consequently the aft stage 52) as the primary airstream 73. Immediately downstream of the aft fan stage 52, the primary stream 73 is generally divided into the second stream 72 and the core stream 62.

An airflow control system 86 of the engine 20 may facilitate the control of air flow through the bypass duct 82, through the auxiliary flowpath 74, and through the second flowpath 70, or any combination thereof. The control system 86 may include a controller 88 and an isolation valve or duct blocker 92. The controller 88 may receive sensory or operator input, processes the input, and outputs an electronic control signal 96 that operates the valve 92. It is contemplated and understood that the valve 92 may be any variety of valve-like structures including single-bodied units capable of both pathway isolation and variable flow control. It is further understood that the term 'valve' may include a plurality of blocker doors and/or aerodynamically shaped flaps that may be circumferentially distributed and operated by a common sync-ring as one, non-limiting, example.

The controller 88 may be, for example, part of a flight control computer, a portion of a Full Authority Digital Engine Control (FADEC), a stand-alone unit or other system. The control module typically includes a processor, a memory, and an interface. The processor may be any type of microprocessor having desired performance characteristics. The memory may be any computer readable medium that stores data and control algorithms such as logic as described herein. The interface facilitates communication with other components such as a valve actuator.

The valve 92 may generally be located in the bypass duct 82 and may be generally supported by at least one of the inner and outer housings 78, 80. When the valve 92 is in a closed position, all of the incoming airflow (see arrow 104 in FIG. 1) is directed through both the leading and aft stages 44, 52 of the fan section 22. When exiting the fan section 22, the airflow 104 (i.e. with valve 92 closed) is generally divided into the core stream 62 and the second stream 72. In this configuration, the engine 20 is capable of maximum power with high thrust that may be advantageous for takeoff flight conditions.

When the valve 92 is in the open position, the bypass stream 84 enters the second flowpath 70 to join with the second stream 72. Although total pressure may be greater in the second flowpath 70 than in the bypass duct 82, the static pressure may be about the same, thus allowing flow to occur from the bypass duct 82 to the second flowpath 70. In this configuration, the engine 20 is capable of operating in an exhaust management mode at low-speed cruise flight conditions with low thrust. It is further contemplated and understood that the bypass duct 82 in some engine applications may not require a valve, and may instead be properly sized for the desired flows and pressures under a range of engine operating conditions. Yet further and in some engine applications that may benefit from the present disclosure the bypass duct 82 may not be required, and the fan leading and aft stages 44, 52 may still be driven via separate spools.

The airflow control system 86 may also include at least one heat exchanging device 118 each having a heat exchanger 120, a control valve 122, and a pathway or conduit loop 124 for the supply flow of heated air and subsequent return of cooled air. Each valve 122 may be controlled via an electronic signal 126 from the controller 88. The heat exchanger 120 and valve 122 may be of an annular architecture and/or multiple discrete passages, ducts, or other selectively controlled flow path configurations distributed about the circumference of the second flowpath 70. The valve 122 selectively flows a portion (see arrow 128) of the second stream 72 from the second flowpath 70 into the auxiliary flowpath 74 via the cold side of the heat exchanger 120 for cooling the air flowing through pathway 124. With the control valve(s) 122 open, the stream portion 128 is generally heated and becomes part of (or substantially is) the auxiliary stream 76 thereby acting as a 'heat sink' for the heat exchanger 120.

The conduit loop 124 of the heat exchanging device may receive hot air from within the diffuser case module 60 and returns the air in a cooled state to the compressor section 24 for cooling of components therein. Other, non-limiting, examples of the device may have a conduit loop that receives hot air from the turbine section 28 and returns the air in a cooled state to the turbine section 28 for cooling of components therein. Yet another example may include a conduit loop that receives hot air from a component that is external to the engine 20 and returns the air to a location external from the engine 20. It is further contemplated and understood that the other conduit loops may flow hot air sourced from other engine sections, stages, or systems, and return the air in a cooled state to any one or combination of the engine sections, stages, or systems.

The heat exchanging device 118 may also be utilized to vary the pressure drop in the second flowpath 70, as the pressure drop through the cold side of the heat exchanger 120 is enhanced through discharge of the selected portion 128 of the second stream 72 into the auxiliary flowpath 74, which may be at a lower pressure. It should also be appreciated that although a particular device 118 is defined and schematically illustrated, such as the heat exchanger 120 and the valve 122, the valve may not be used and instead, the heat exchanger itself may have a pre-determined pressure drop (e.g. pre-sized, internal orifices) capable of establishing flows within an acceptable range. Yet further, the stream portion 128 flow may, at least in-part, be controlled via actuation of the isolation valve 92 (i.e. with or without use of valve 122) that may controllably vary the pressure differential between the second flowpath 70 and the auxiliary flowpath 74.

With the high spool driven aft stage 52 and the airflow control system 86, the fan section 22 is higher in efficiency and higher in maximum fan pressure ratio (FPR) capability without compromise, when compared to more traditional engines. In addition, the HPT 56 is higher in efficiency and requires less cooling, and the LPT 48 may employ fewer stages and requires less cooling than more traditional engines. Similar to more traditional three stream engines, the present engine 20 with the HPT driven fan stage 52 provides for cruise power fan flow holding for reduced spillage drag. The auxiliary stream 76 pressure may be similar to a stage three in the more traditional three stream engines because of the pressure drop across the heat exchanging device 118 resulting in similar propulsion efficiencies. The engine 20 of the present disclosure has higher fan pressure ratio capability than more traditional engines with a more balanced turbomachinery. This provides for a more compact propulsion system that is lighter and shorter.

Figure 2:
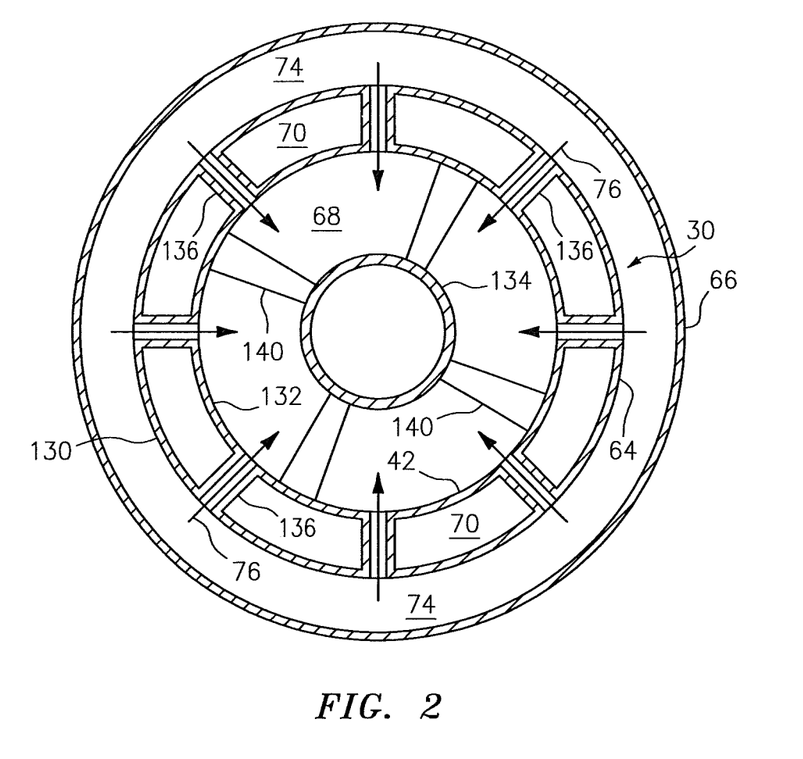
FIG. 2 is a cross section of a turbine exhaust case of the engine taken along line 2-2 in FIG. 1.

Referring to FIGS. 1 and 2, the TEC 30 may generally be an integral part of the auxiliary flowpath 74, the second or bypass flowpath 70 and the core flowpath 68. More specifically, the TEC 30 may include a ring-shaped outer shroud 130 that may be part of the intermediate case 64, a ring-shaped intermediate shroud 132 that may be part of the inner case 42, and an inner shroud 134. The annular second flowpath 70 and the generally annular core flowpath 68 are thereby defined in-part by the respective outer, intermediate, and inner shrouds 130, 132, 134, and thereby extend or communicate through the TEC 30. The auxiliary flowpath 74 may generally terminate at the TEC 30.

A plurality of hollow stanchions or tubes 136 of the TEC 30 may extend between the outer and intermediate shrouds, and may further be circumferentially spaced from one another. Each tube 136 is in direct fluid communication between the auxiliary flowpath 74 and the core flowpath 68 for flowing the auxiliary stream 76 directly into the core flowpath 68 (i.e. bypasses the second flowpath 70) for mixing with the core stream 62. The resulting mixed stream (see arrow 138 in FIG. 1) may then be de-swirled via a plurality of circumferentially spaced airfoils 140 of the TEC 30 that extend radially between the inner shroud 134 and the intermediate shroud 132. The mixed and de-swirled stream 138 is then discharged from the TEC 30 and into the augmentor section 32 followed by the exhaust duct section 34. One advantage of the present, novel, disclosure is that the auxiliary stream 76 may be combusted in the augmentor 32 to increase thrust. Known auxiliary stream (i.e. 2.5 and 3.0 stream) configurations typically exhaust the auxiliary stream through a separate nozzle that bypasses the augmentor. The present disclosure provides a sink for any variety of cooling systems and allows full augmentation of all of the air entering into the engine 20. For a given level of augmented thrust, the configuration presented herein may be sized smaller and lighter than other auxiliary stream configurations.

The augmentor and exhaust duct sections 32, 34 together define a generally cylindrical exhaust flowpath 142 that may be concentrically located about the engine axis A and may be in direct fluid communication with the annular core flowpath 68 at the TEC 30. The exhaust flowpath 142 generally terminates at the exhaust nozzle 77, the auxiliary flowpath 74 generally terminates at the TEC 30, and the second flowpath 70 generally terminates at the exhaust duct section 34. The exhaust duct section 34 may be circular in cross-section, which may be typical of an axis-symmetric augmented low bypass turbofan. Alternatively or additionally, the exhaust duct section 34 may be non-axisymmetric in cross-section or of another shape, and/or may be non-linear with respect to the central longitudinal engine axis A to form, for example, a serpentine shape that may block a direct view of the turbine section 28 and/or TEC 30.

The mixed stream 138 discharged from the annular core flowpath 68 at the TEC 30 is received by the exhaust flowpath 142, and discharged through the exhaust nozzle 77 of the nozzle section 36. Fuel may also be selectively injected into the core stream 62 in at least the augmentor section 32 downstream of the TEC 30 to generate additional thrust through the mixed flow exhaust nozzle 77 from the exhaust duct section 34.

The second stream 72 flowing through the second flowpath 70 may be utilized, for example, to enhance heat transfer or pressurize, another component or cavity. Moreover, the second stream 72 may be, at least partially, injected into the exhaust flowpath 142 adjacent the augmentor section 32 and the exhaust duct section 34 (illustrated schematically by flow arrows 81 through an augmentor liner 83) wherein the second stream 72 mixes with the mixed stream 138 and is exhausted or discharged through the flow exhaust nozzle 77 as an exhaust stream 144. Alternatively and as another, non-limiting, example, the second stream 72 may be, at least partially, continued past the exhaust duct section 34 and used to cool the flow exhaust nozzle and maximize thrust as the stream is injected into the exhaust flowpath 142. In another example, the second stream 72 may be, at least partially, exhausted or discharged through a separate nozzle (not illustrated) to maximize thrust recovery.

Figure 3:
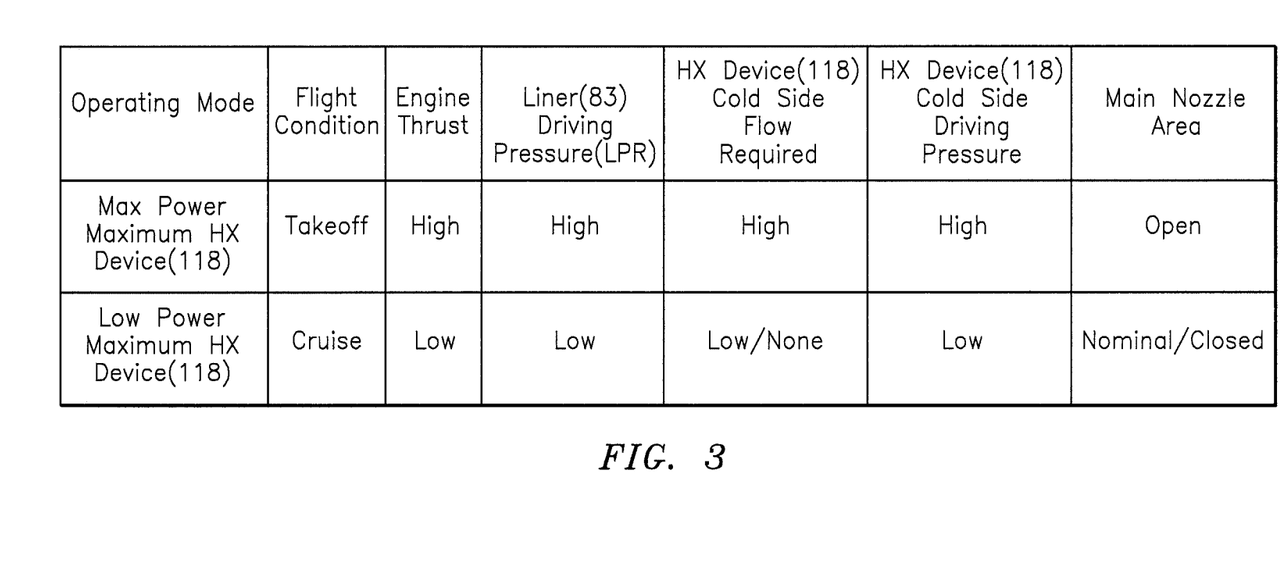
FIG. 3 is a table illustrating a variety of modes of engine operation.

Referring to FIG. 3, as the engine 20 is throttled between high and low power, the engine liner 83 pressure ratio can be managed such that a high liner pressure ratio may be available at high power to ensure the exhaust stream 142 is cooled. Moreover, a low liner 83 pressure ratio may be maintained at cruise for improved fuel efficiency. The flow area of the nozzle 77 may be used for this purpose. This desired behavior can be exploited with the passive heat exchanging device 118 as substantially the same driving pressure for the heat exchanging device 118 is used in the exhaust liner 83 cooling with the same trends desired. It is contemplated and understood that at least a portion of these benefits may be realized with the heat exchanging device 118 and the 'flow-through' TEC 30 as described, and without application of the leading and aft fan stages 44, 52 being driven by separate spools.

While the invention is described with reference to exemplary embodiment(s), it will be understood by those skilled in the art that various changes may be made and equivalents may be substituted without departing from the spirit and scope of the invention. Therefore, different modifications may be made to adapt the teachings of the invention to particular situations or materials, without departing from the essential scope. The invention is thus not limited to the particular examples and/or disclosed structures, but includes all embodiments falling within the scope of the appended claims, which scope is accorded the broadest interpretation so as to encompass all such modifications, equivalent structures and methods. Moreover, although particular step sequences may be shown, described, and claimed, it is understood that steps may be performed in any order, separated or combined unless otherwise indicated and will still benefit from the present disclosure. It is further understood that when the language "at least a portion," "a portion," and/or "at least in-part" is used in the claims, the item may include a portion and/or the entire item unless specifically stated to the contrary.

What is claimed is:

1. A gas turbine engine comprising:
   a fan section constructed and arranged to receive and expel an airflow;
   a compressor section in fluid communication with the fan section and constructed and arranged to receive a first stream of the airflow discharged from the fan section;
   a combustor section in fluid communication with the compressor section and constructed and arranged to receive at least a portion of the first stream discharged from the compressor section;
   a turbine section in fluid communication with the combustor section and constructed and arranged to receive and extract power from the at least a portion of the first stream discharged from the combustor section, wherein the turbine section is rotationally coupled to the compressor section and the fan section;
   a first case that defines a boundary of a first flowpath for a flow of the first stream;
   a second flowpath in fluid communication with the fan section and constructed and arranged to receive a second stream of the airflow discharged from the fan section;
   a turbine exhaust case disposed downstream of the turbine section and constructed and arranged to separately receive and expel the first stream and the second stream;
   a heat exchanging device in fluid communication with the second flowpath and constructed and arranged to flow at least a portion of an auxiliary stream of the second stream; and
   an auxiliary flowpath in fluid communication between the heat exchanging device and the turbine exhaust case and constructed and arranged to receive the at least a portion of the auxiliary stream discharged from the heat exchanging device and discharge the auxiliary stream into the turbine exhaust case for mixing with the first stream as a mixed stream, wherein the auxiliary flowpath is radially outward from the second flowpath at an axial location radially adjacent to the turbine section.

2. The gas turbine engine set forth in claim 1, wherein the compressor section, the combustor section, the turbine section and the turbine exhaust case together form the first flowpath for the flow of the first stream.

3. The gas turbine engine set forth in claim 1 further comprising:
an exhaust duct section in fluid communication with the turbine exhaust case and constructed and arranged to receive the mixed stream and the second stream discharged from the turbine exhaust case.

4. The gas turbine engine set forth in claim 3, wherein the turbine exhaust case and the exhaust duct section each include in-part a portion of the second flowpath.

5. The gas turbine engine set forth in claim 4, wherein the second flowpath is annular in shape.

6. The gas turbine engine set forth in claim 2, wherein the turbine exhaust case includes in-part the second flowpath and includes in-part the first flowpath.

7. The gas turbine engine set forth in claim 2, wherein a turbine exhaust duct section includes a portion of the second flowpath and at least a portion of a substantially cylindrical exhaust flowpath in axial fluid communication with the first flowpath at the turbine exhaust case.

8. The gas turbine engine set forth in claim 5, wherein an exhaust flowpath is in fluid communication with the second flowpath to receive a remaining portion of the second stream discharged from the second flowpath.

9. The gas turbine engine set forth in claim 7, wherein an exhaust flowpath is constructed and arranged to receive the mixed stream discharged from the turbine exhaust case.

10. The gas turbine engine set forth in claim 1 further comprising:
a high spool constructed and arranged to rotate about an engine axis; and
a low spool constructed and arranged to rotate about the engine axis, and wherein the fan section includes a fan leading stage connected for rotation to the low spool, and a fan aft stage connected for rotation to the high spool,
wherein the turbine section includes a high pressure turbine connected to the high spool and a low pressure turbine connected to the low spool.

11. The gas turbine engine set forth in claim 2, wherein the heat exchanging device includes a conduit loop in direct fluid communication between the first flowpath and a hot side of the heat exchanging device for flowing heated air discharged from the first flowpath to the hot side and returning cooled air from the hot side to the first flowpath for cooling engine components, and wherein a cold side of the heat exchanging device is in fluid communication between the second flowpath and the auxiliary flowpath and is constructed and arranged to flow at least the portion of the auxiliary stream as heated air.

12. The gas turbine engine set forth in claim 2, wherein the turbine exhaust case includes a first shroud, a second shroud, and a plurality of circumferentially spaced conduits extending radially between and in fluid communication through the first shroud and the second shroud for flowing the auxiliary stream from the auxiliary flowpath and into the first flowpath.

13. A gas turbine engine comprising:
a fan section;
a turbine section;
a first case concentrically located about an engine axis, wherein a first flowpath is defined radially inward of the first case for flowing a first stream;
a second case spaced radially outward of the first case, wherein a second flowpath is defined radially between the first case and the second case for flowing a second stream;
an outer case spaced at least in-part radially outward from the second case, wherein an auxiliary flowpath is defined at least in-part radially between the second case and the outer case for flowing an auxiliary stream, wherein the auxiliary flowpath is radially outward from the second flowpath at an axial location radially adjacent to the turbine section; and
a turbine exhaust case including a portion of the first case and the second case, wherein the auxiliary flowpath is in fluid communication with the second flowpath for receiving at least a portion of the auxiliary stream discharged from the second flowpath and upstream of the turbine exhaust case, and wherein the auxiliary flowpath is in fluid communication with the first flowpath at the turbine exhaust case for expelling the auxiliary stream into the first flowpath.

14. The gas turbine engine set forth in claim 13 further comprising:
a heat exchanging device constructed and arranged to provide the fluid communication between the second flowpath and the auxiliary flowpath located upstream of the turbine exhaust case.

15. The gas turbine engine set forth in claim 11 further comprising:
a high spool constructed and arranged to rotate about an engine axis; and
a low spool constructed and arranged to rotate about the engine axis, and wherein the fan section includes a fan leading stage connected for rotation to the low spool, and a fan aft stage connected for rotation to the high spool.

16. The gas turbine engine set forth in claim 15, wherein the turbine section includes a high pressure turbine connected to the high spool and a low pressure turbine connected to the low spool.

17. The gas turbine engine set forth in claim 14, wherein the heat exchanging device includes a conduit loop in direct fluid communication between the first flowpath and a hot side of the heat exchanging device for flowing heated air from the first flowpath to the hot side and returning cooled air from the hot side and through the first case for cooling components within the first case, and wherein a cold side of the heat exchanging device is constructed and arranged to flow at least the portion of the auxiliary stream discharged from the second flowpath as heated air.

18. The gas turbine engine set forth in claim 14, wherein the turbine exhaust case is constructed and arranged to mix the auxiliary stream with the first stream in the first flowpath.

19. A method of operating a gas turbine engine comprising:
diverting a portion of a second stream flowing through a second flowpath located radially outward of a first flowpath;
flowing the portion of the second stream through a heat exchanging device;
discharging the portion of the second stream into an auxiliary flowpath that is located radially outward from the second flowpath at an axial location radially adjacent to a turbine section of the gas turbine engine and as at least a portion of an auxiliary stream;
discharging the auxiliary stream from the auxiliary flowpath and into a turbine exhaust case; and
mixing the auxiliary stream with a first stream in the first flowpath at the turbine exhaust case.

20. The gas turbine engine set forth in claim 1, wherein the turbine exhaust case includes a plurality of tubes, wherein each of the plurality of tubes is in direct fluid communication between the auxiliary flowpath and the first flowpath to flow the auxiliary stream directly into the first flowpath to obtain the mixed stream, and wherein the flow of the auxiliary stream directly into the first flowpath bypasses the second stream of the second flowpath.

* * * * *